| United States Patent [19] | [11] | 4,224,300 |
|---|---|---|
| Takahashi et al. | [45] | Sep. 23, 1980 |

[54] PROCESS FOR PREPARATION OF CARBONYL SULFIDE

[75] Inventors: Nobuo Takahashi, Shizuoka; Masanobu Uchiyama, Fuji; Takaaki Futami, Shimada; Yoji Imamiya, Shizuoka, all of Japan

[73] Assignee: Ihara Chemical Industry Co., Ltd., Tokyo, Japan

[21] Appl. No.: 68,743

[22] Filed: Aug. 22, 1979

[51] Int. Cl.$^2$ ............................................. C01B 31/26
[52] U.S. Cl. ................................................... 423/416
[58] Field of Search ............................. 423/416–418, 423/414, 415

[56] References Cited

U.S. PATENT DOCUMENTS

| 2,983,580 | 5/1961 | Kerr | 423/416 |
| 3,764,661 | 10/1973 | Kanazawa et al. | 423/416 |
| 4,078,045 | 3/1978 | Nakayama et al. | 423/416 |

FOREIGN PATENT DOCUMENTS 1222024  8/1966  Fed. Rep. of Germany ........... 423/416

Primary Examiner—Earl C. Thomas
Attorney, Agent, or Firm—Armstrong, Nikaido, Marmelstein & Kubovcik

[57] ABSTRACT

Carbon monoxide is reacted with sulfur in the vapor phase at 250°–650° C. to prepare carbonyl sulfide, wherein a reactor is used, in which at least the inner surface is made of an alloy consisting essentially of, based on the weight of the alloy, 20–60% of Cr, 40–65% of Ni, 0–10% of Mo, 0–4% of Nb+Ta, and 0–3% of Fe. The reactor not only possesses good corrosion resistance to the gaseous reaction mixture, but also minimizes the reduction in the purity of carbonyl sulfide produced, which reduction occurs with the lapse of operation time.

7 Claims, No Drawings

PROCESS FOR PREPARATION OF CARBONYL SULFIDE

BACKGROUND OF THE INVENTION (1) Field of the Invention

This invention relates to a process for the preparation of carbonyl sulfide by reacting carbon monoxide with sulfur in the vapor phase within a reactor, in which at least the inner surface is made of a special chromium-nickel alloy.

(2) Description of the Prior Art

Carbonyl sulfide is useful as raw material for the production of pesticides, pharmaceuticals and other chemicals. Many proposals have been heretofore made to produce carbonyl sulfide. Illustrations of such proposals are a process wherein a mixture of carbon disulfide and carbon dioxide is heated in the presence of a catalyst; a process wherein a mixture of carbon disulfide and sulfur dioxide is heated in a sealed tube; a process wherein a mixture of hydrogen sulfide and carbon monoxide is heated; a process wherein ammonium thiocyanate is treated with sylfuric acid; and a process wherein a mixture of carbon monoxide and sulfure is heated in the vapor phase in the presence or absence of a catalyst. Of these proposed processes, the last-mentioned process, i.e., the process involving the vapor phase reaction of sulfur with carbon monoxide, is said to be the most advantageous.

Several processes are already known wherein sulfur is reacted in the vapor phase with carbon monoxide. For example, German Anslegeschrift No. 1,222,024 discloses a process wherein carbon monoxide is reacted with sulfur in the vapor phase in the absence of a catalyst at a temperature of from 350° to 510° C. U.S. Pat. No. 2,983,580 discloses the vapor phase reaction of sulfur with carbon monoxide effected in the presence of an aluminosilicate catalyst at a temperature of from 500° to 900° F., i.e., from 260° to 483° C. U.S. Pat. No. 3,764,661 discloses a process wherein carbon monoxide is continuously blown into molten sulfur having incorporated therein anhydrous alkali metal sulfide, and then, the resulting gaseous mixture is brought into contact with anhydrous heavy metal sulfide maintained at an elevated temperature. U.S. Pat. No. 4,078,045 discloses the vapor phase reaction of sulfur with carbon monoxide effected in the presence of an alkaline earth metal compound catalyst at a temperature of from 250° to 450° C.

The above-mentioned processes wherein sulfur is reacted in the vapor phase with carbon monoxide generally have a problem such that the purity of carbonyl sulfide produced generally decreases with the lapse of time in a continuous extended operation. This problem is observed more or less whether the vapor phase reaction is effected in the presence or absence of a catalyst. However, the decrease in the purity of carbonyl sulfide produced is more conspicuous in the case where the vapor phase reaction is effected in the absence of a catalyst and at a relatively high temperature.

Furthermore, the above-mentioned patent references are silent on the construction material for the reactor used. It is presumed that most known construction materials are not completely satisfactory in their anticorrosion properties for use us a reactor for the vapor phase reaction of preparing carbonyl sulfide. This is because at a high temperature, the reaction mixture mainly comprised of carbonyl sulfide possesses a conspicuous corrosive action.

SUMMARY OF THE INVENTION

It now has been found that, when a reactor, in which at least the inner wall is made of a special chromium nickel alloy mentioned below, is used in the vapor phase reaction of sulfur with carbon monoxide, the purity of carbonyl sulfide produced decreases only to a negligible extent with the lapse of operation time in a continuous extended operation. It is known that the specified chromium-nickel alloy exhibits a good corrosion resistance for general purposes. It is surprising, however, that the specified chromium-nickel alloy not only exhibits a good corrosion resistance against the reaction mixture of the vapor phase reaction of preparing carbonyl sulfide, but also minimizes the reduction in the purity of carbonyl sulfide produced which reduction occurs with the lapse of operation time.

In accordance with the present invention, there is provided a process for preparing carbonyl sulfide by the vapor phase reaction of carbon monoxide with sulfur wherein a gaseous mixture of sulfur with carbon monoxide is maintained at an elevated temperature, characterized by effecting said vapor phase reaction in a reactor, in which at least the inner surface is made of an alloy consisting essentially of, based on the weight of the alloy, from 20 to 60% of chromium, from 40 to 65% of nickel, from 0 to 10% of molybdenum, from 0 to 4% of niobium plus tantalum, and from 0 to 3% of iron.

PREFERRED EMBODIMENTS OF THE INVENTION

A gaseous mixture of carbon monoxide and sulfur, to be fed to a reaction zone, may be prepared either by a procedure wherein a flow of carbon monoxide and a flow of sulfur vapor are joined and blended together or by a procedure wherein carbon monoxide is caused to bubble through molten sulfur maintained at temperature of from 300° to 440° C. When carbon monoxide is caused to bubble through the molten sulfur, molten sulfur is entrained by the bubbles of carbon monoxide whereby the evaporation of sulfur is accelerated and the desired gaseous mixture is prepared.

Among the above-mentioned two procedures, the latter procedure, wherein carbon monoxide is caused to bubble through molten sulfur, is preferable for the following reasons. First, even when the vapor phase reaction of the so prepared gaseous mixture is conducted at a higher temperature compared with those employed in conventional processes, i.e., conducted at a temperature from approximately 500° C. to approximately 650° C., carbonyl sulfide with a high purity can be obtained. It is surprising that, when carbon monoxide is caused to bubble through molten sulfur and the resulting gaseous mixture is placed under the stated reaction conditions, the thermal decomposition of carbonyl sulfide occurs only to a negligible extent, thereby obtaining carbonyl sulfide with a high purity. It is presumed that the sulfur present in the gaseous mixutre, so prepared, is of a special molecular configuration which is not liable to be thermally decomposed. Secondly, the proportion of sulfur to carbon monoxide present in the gaseous mixture does not vary to an appreciable extent, even when the flow rate in volume of carbon monoxide blown into the molten sulfur fluctuates. Therefore, the proportion of sulfur to carbon monoxide can be easily maintained at a constant. Furthermore, the proportion of sulfur to carbon monoxide can be easily controlled merely by varying the temperature of the moltent sulfur.

The molar ratio of sulfur to carbon monoxide present in the gaseous mixture should preferably be approximately 1.0 or more. By the term "molar ratio of sulfur to carbon monoxide" herein used is meant the ratio of the number of sulfur atoms to the number of carbon monoxide molecules. When the molar ratio is smaller than this, the gaseous reaction product withdrawn from the reactor contains a salient amount of unreacted carbon monoxide, leading to reduction in the purity of the carbonyl sulfide product. In the case where the gaseous mixture is prepared by causing carbon monoxide to bubble through molten sulfur, the amount of sulfur evaporated is approximately in proportion to the amount of carbon monoxide blown into the molten sulfur, and, the proportion of sulfur to carbon monoxide can be controlled by varying the temperature of the molten sulfure. In general, the molar ratio of sulfur to carbon monoxide can be varied within the range of from approximately 1.0 to 7.0 by varying the temperature of the molten sulfur within the range of from 300° to 440° C.

The gaseous mixture of sulfur with carbon monoxide is maintained at a reaction temperature in a reactor, whereby sulfur and carbon monoxide are reacted with each other. The reaction temperature may be in the range of from approximately 250° to 650° C. When a catalyst (e.g. an aluminosilicate or a metal sulfide) is used, the reaction temperature may be moderate, for example, from approximately 250° to 500° C. In contrast, when no catalyst is used, the reaction temperature is preferably relatively high, i.e., from approximately 400° to 650° C., more preferably from approximately 500° to 650° C. At the reaction temperature of not higher than approximately 250° C., the reaction rate is vely low. In contrast, at the reaction temperature higher than 650° C., the thermal decomposition of carbonyl sulfide occurs to a considerable extent thereby producing salient amounts of carbon dioxide and carbon disulfide.

The reaction period i.e., the contact time, may be varied depending on the reaction temperature, and usually in the range of a half second to approximately five minutes. Preferably, the contact time is in the range of from three seconds to twenty seconds. Contact time exceeding five minutes invites the thermal decomposition of carbonyl sulfide. The vapor phase reaction is carried out in either atmospheric or superatmospheric pressure.

The reactor used in the process of the invention is characterized in that the wall thereof is made of a chromium-nickel alloy having the following composition or the inner wall of the reactor is lined with such a chromium-nickel alloy. The chromium-nickel alloy consists essentially of, based on the weight of the alloy, from 20 to 60% of chromium, from 40 to 65% of nickel, from 0 (inclusive) to 10% of molybdenum, from 0 (inclusive) to 4% of niobium plus tantalum, and from 0 (inclusive) to 3% of iron. The chromium-nickel alloy preferably consists essentially of, based on the weight of the alloy, from 45 to 53% of chromium, from 45 to 54% of nickel, from 0 (inclusive) to 1% of iron. The chromium-nickel alloy may contain trace amounts of other elements such as carbon, manganese, sulfur, titanium, phosphorus, silicon, aluminum and nitrogen. The maximum amount of each of these trace elements is not larger than 1.0%, preferably not larger than 0.5%, based on the weight of the alloy.

The chromium nickel alloys used are known per se and include, for example, those listed in Table I, below.

Table I

| Specimen No. | Cr | Ni | C | Mn | Fe | S | Ti | P | Nb | Si | Al | N | Mo |
|---|---|---|---|---|---|---|---|---|---|---|---|---|---|
| 1 | 48~52 | *bal | ≦0.1 | ≦0.3 | ≦1.0 | <0.02 | — | ≦0.02 | 1.4~1.7 | ≦0.5 | — | ≦0.16 | — |
| 2 | 48~52 | *bal | ≦0.1 | ≦0.3 | ≦0.3 | <0.02 | ≦0.5 | ≦0.02 | — | ≦1.0 | — | ≦0.3 | — |
| 3 | 47.4 | 50.89 | 0.06 | 0.08 | 0.89 | 0.007 | 0.31 | — | — | 0.34 | — | — | — |
| 4 | 21.5 | 61.0 | 0.05 | 0.25 | 2.50 | 0.007 | 0.2 | — | Nb + Ta 3.65 | 0.25 | 0.2 | — | 9.0 |

*bal = balance
Specimen No. 1: 50Cr—50Ni alloy (trade name "NAR-H50Nb", supplied by International Nickel Co.)
Specimen No. 2: 50Cr—50Ni alloy (trade name "NAR-H50Ti", supplied by International Nickel Co.)
Specimen No. 3: (trade name "Inconel 671", supplied by International Nickel Co.)
Specimen No. 4: (trade name "Inconel 625", supplied by International Nickel Co.)

The optimum chromium-nickel alloy consists essentially of, based on the weight of the alloy, from 46 to 50% of chromium, from 49 to 53% of nickel and from 0 (inclusive) to 1% of iron. A typical example of the optimum chromium-nickel alloy is specimen No. 3 mentioned above.

The above-mentioned composition of the chromium-nickel alloy is critical for the following reasons. First, the purity of carbonyl sulfide produced is high and, under preferable reaction conditions, reaches approximately 98% or more. Secondly, such a high purity of carbonyl sulfide decreases only to a negligible extent with the lapse of time in a continuous extended operation. Thirdly, the corrosion resistance to the gaseous reaction mixture mainly comprised of carbonyl sulfide is satisfactory.

The type of the reactor used is not particularly limited. One preferable type is a vertically arranged cylindrical reactor provided with a molten sulfur reservoir at the bottom thereof. The entire wall thickness of the reactor may be made of the above-mentioned chromium-nickel alloy, but, in consideration of the cost, it is preferable to line the inner wall of the reactor with the above-mentioned chromium-nickel alloy. The lining of the alloy may preferably have a thickness of from 1 mm to 5 mm and may be formed in any conventional manner, for example, by a cladding procedure. The construction material for the reactor, to be lined with the above-mentioned alloy, may be conventional provided that the material has good mechanical strengths.

The gaseous reaction product withdrawn from the reactor contains a salient amount of sulfur vapor. Such gaseous reaction product may be purified as follows. The gaseous reaction product is cooled preferably to a temperature of from 120° to 150° C. whereby a substantial part of the sulfur vapor is condensed to be separated. Then, the gaseous reaction product, which contains a minor amount of sulfur in the form of mist, is brought into contact with molten sulfur maintained preferably at a temperature of from 120° to 150° C. whereby the mist of sulfur is substantially removed from the gaseous reaction product. Thereafter, the gaseous reaction product is passed through a column packed with anticorrosive packing materials thereby to remove the remaining sulfur. If desired, the gaseous reaction product may be brought into contact with water thereby to remove completely the remaining sulfur.

The gaseous reaction product, from which unreacted sulfur has been recovered, is usually comprised of, by weight, at least 97% of carbonyl sulfide, less than 2% of carbon monoxide, less than 0.2% of carbon dioxide and less than 0.2% of carbon disulfide. The gaseous reaction product of such a composition may be further purified in a conventional manner, if desired.

The invention will be further illustrated by the following examples.

EXAMPLE 1

A vertically arranged cylindrical reactor having an inner diameter of 5 cm, made of a chromium-nickel alloy, and provided with a molten sulfur pool at the bottom was used. The chromium nickel alloy had the following composition:

|  | % by weight |
|---|---|
| Chromium | 47.4 |
| Nickel | 50.89 |
| Carbon | 0.06 |
| Manganese | 0.08 |
| Iron | 0.89 |
| Sulfur | 0.007 |
| Titanium | 0.31 |
| Silicon | 0.34 |

Carbon monoxide was continuously blown into the molten sulfur at a position 3 cm below the free surface of the molten sulfur at a flow rate of 0.5 Nm$^3$/hr and a gauge pressure of 0.2 kg/cm$^2$. The molten sulfur was maintained at a temperature of approximately 360° C. The molten sulfur was in a turbulent state in the vicinity close to the free surface. The free surface of the molten sulfur was covered by bubbles formed of thin molten sulfur films, from which surface minute particulates of molten sulfur were splashed. The molar ratio of sulfur to carbon monoxide present in the gaseous mixture formed from the bubbles was 1.3. The gaseous mixture was maintained at a temperature of 550° C. in the reaction zone above the molten sulfur pool whereby sulfur and carbon monoxide were reacted with each other. The reaction time was approximately 8 seconds. The gaseous reaction product was cooled to an ambient temperature whereby unreacted sulfur is condensed to be recovered.

The resultant product had the composition shown in Table II, below. The above-mentioned operation for the preparation of carbonyl sulfide was continued over a period of twelve months. After six months' of the operation and after twelve months' of the operation, the composition of the product was analyzed. The results are shown in Table II, below.

For a comparison purpose, the vapor phase reaction of sulfur with carbon monoxide was conducted by using a reactor which was similar to that mentioned above, but made of Hastelloy C (trade name; an alloy consisting essentially of, based on the weight of the alloy, 57% of nickel, 17% of molybdenum, 16.5% of chromium, 4.5% of tungsten and 5% of iron). The reaction conditions were similar to those mentioned above. The results are shown in Table II, below.

Table II

|  |  | Composition of Product (wt. %) | | | |
|---|---|---|---|---|---|
|  |  | COS | CO | CO$_2$ | CS$_2$ |
| Example | Immediately after | 98.0 | 1.7 | 0.15 | 0.15 |
|  | 6 months after | 97.7 | 1.9 | 0.2 | 0.2 |
|  | 12 months after | 97.5 | 2.0 | 0.3 | 0.2 |
| Comparative Example | Immediately after | 95.0 | 4.0 | 0.5 | 0.5 |
|  | 6 months after | 92.9 | 4.5 | 1.4 | 1.2 |
|  | 12 months after | 89.7 | 5.5 | 2.6 | 2.2 |

EXAMPLE 2

Following a procedure similar to that mentioned in Example 1, the vapor phase reaction of sulfur with carbon monoxide was conducted wherein reactors made of various alloys were separately used, with all other conditions remaining substantially the same. The compositions of the alloys used as the construction material for the reactors were as follows.

Specimen 1: 50Cr-50Ni: trade name "NAR-H50Nb", same as specimen 1 in Table I.

Specimen 4: trade name "Inconel 625", same as specimen 4 in Table I.

Specimen 5: trade name "Inconel", consisting essentially of 80% of nickel, 14% of chromium and 6% of iron.

Specimen 6: 18-8 stainless steel.

Specimen 7: trade name "Monel", consisting essentially of 67% of nickel, 30% of copper and 1.4% of iron.

The purity of the resultant carbonyl sulfide, i.e., the content of carbonyl sulfide in the product from which unreacted sulfur had been removed, was as shown in Table III, below.

Table III

|  | Content of COS (wt. %) | | |
|---|---|---|---|
| Alloy speciman | Immediately after | 15 days after | 30 days after |
| 1(Invention) | 98.0 | 98.0 | 97.9 |
| 4(Invention) | 97.5 | 97.5 | 97.6 |
| 5(Comparative Example) | 96.0 | 95.8 | 95.5 |
| 6(Comparative Example) | 96.0 | 95.5 | 90.2 |
| 7(Comparative Example) | 95.5 | 90.0 | 82.5 |

What we claim is:

1. A process for preparing carbonyl sulfide by the vapor phase reaction of carbon monoxide with sulfur wherein a gaseous mixture of sulfur with carbon monoxide is maintained at an elevated temperature, characterized by effecting said vapor phase reaction in a reactor, in which at least the inner surface is made of an alloy consisting essentially of, based on the weight of the alloy, from 20 to 60% of chromium, from 40 to 65% of nickel, from 0 to 10% of molybdenum, from 0 to 4% of niobium plus tantalum, and from 0 to 3% of iron.

2. A process according to claim 1 wherein said alloy consists essentially of, based on the weight of the alloy, from 45 to 53% of chromium, from 45 to 54% of nickel, from 0 to 2% of niobium and from 0 to 1% of iron.

3. A process according to claim 1 wherein said alloy consists essentially of, based on the weight of the alloy, from 46 to 50% of chromium, from 49 to 53% of nickel and from 0 to 1% of iron.

4. A process according to claim 1, 2 or 3 wherein the vapor phase reaction of sulfur with carbon monoxide is carried out at a temperature of from approximately 250° C. to approximately 650° C. for a period of from ½ second to five minutes.

5. A process according to claim 1, 2, or 3 wherein the vapor phase reaction of sulfur with carbon monoxide is carried out at a temperature of from approximately 500° C. to approximately 650° C.

6. A process according to claim 1, 2 or 3 wherein the gaseous mixture of sulfur with carbon monoxide is prepared by causing carbon monoxide to bubble through molten sulfur maintained at a temperature of from 300° to 440° C.

7. A process according to claim 6 wherein the molar ratio of sulfur (expressed in terms of atomic sulfur) to carbon monoxide, both in the gaseous mixture, is in the range of from approximately 1.0/1 to 7.0/1.

* * * * *